United States Patent
Madsen et al.

(10) Patent No.: US 12,436,691 B2
(45) Date of Patent: Oct. 7, 2025

(54) DATA STORAGE DEVICE AND METHOD FOR HIDING TWEAK GENERATION LATENCY

(71) Applicant: Sandisk Technologies, Inc., Milpitas, CA (US)

(72) Inventors: Rasmus Madsen, Skovlunde (DK); Mark Myran, Trabuco Canyon, CA (US); Lunkai Zhang, Portland, OR (US); Martin Lueker-Boden, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/439,107

(22) Filed: Feb. 12, 2024

(65) Prior Publication Data
US 2025/0258616 A1 Aug. 14, 2025

(51) Int. Cl.
G06F 3/06 (2006.01)
(52) U.S. Cl.
CPC .......... *G06F 3/0623* (2013.01); *G06F 3/0638* (2013.01); *G06F 3/0673* (2013.01)
(58) Field of Classification Search
CPC ..... G06F 3/0623; G06F 3/0638; G06F 3/0673
See application file for complete search history.

(56) References Cited

U.S. PATENT DOCUMENTS

| | | | |
|---|---|---|---|
| 9,002,002 B1 | 4/2015 | Poo et al. | |
| 11,263,153 B1 | 3/2022 | Cheng | |
| 11,301,153 B2 | 4/2022 | Segev et al. | |
| 11,972,822 B2 | 4/2024 | Hassner et al. | |
| 2017/0054550 A1 | 2/2017 | Choi | |
| 2019/0102577 A1* | 4/2019 | Gueron | G06F 21/79 |
| 2019/0205244 A1 | 7/2019 | Smith | |
| 2020/0169383 A1* | 5/2020 | Durham | H04L 9/0637 |
| 2021/0119780 A1* | 4/2021 | Hassan | H04L 9/088 |
| 2022/0100911 A1* | 3/2022 | Trikalinou | G06F 12/145 |

(Continued)

FOREIGN PATENT DOCUMENTS

| | | |
|---|---|---|
| EP | 4156594 A1 | 3/2023 |
| WO | WO 2018/052577 A1 | 3/2018 |

OTHER PUBLICATIONS

U.S. Appl. No. 18/223,662, filed Jul. 19, 2023, entitled "Data Storage Device and Method for Hiding Tweak Generation Latency.".

(Continued)

*Primary Examiner* — Jared I Rutz
*Assistant Examiner* — Chen Gu
(74) *Attorney, Agent, or Firm* — Crowell & Moring LLP

(57) ABSTRACT

A decryption engine can decrypt encrypted data read from a physical address in a memory of a data storage device. To decrypt the data, the decryption engine can use a tweak value that is generated from a logical address associated with the physical address. To reduce latency, the tweak value can be generated in parallel with the translation of the logical address to the physical address. The tweak value can be stored in a tweak buffer in the decryption engine until needed and can be indexed by a tag associated with a process in a host that is requesting the data. The tweak buffer can use static random-access memory (SRAM) or a content-addressable memory (CAM), for example. Other embodiments are provided.

12 Claims, 12 Drawing Sheets

(56) References Cited

U.S. PATENT DOCUMENTS

| | | | |
|---|---|---|---|
| 2022/0138329 A1 | 5/2022 | Kounavis | |
| 2022/0171545 A1* | 6/2022 | Chritz | G06F 12/0877 |
| 2022/0171887 A1* | 6/2022 | Chritz | H04L 9/3242 |
| 2022/0283731 A1* | 9/2022 | Yoo | G06F 3/0659 |
| 2022/0343029 A1 | 10/2022 | Sultana | |
| 2023/0027329 A1 | 1/2023 | Durham | |
| 2024/0249000 A1 | 7/2024 | Srivastava | |

OTHER PUBLICATIONS

"AES-XTS Block Cipher Mode is used in Kingston's Encrypted USB Flash Drive"; Kingston Technology blog page; downloaded from the Internet on Jul. 18, 2023 at AES-XTS Block Cipher Mode is used in Kingston's best encrypted USB Flash Drives—Kingston Technology; Kingston Technology Corporation; Dec. 2018; 6 pages.

Non-final Office Action mailed Sep. 26, 2024 for U.S. Appl. No. 18/223,662; 10 pages.

"IEEE Standard for Wide-Block Encryption for Shared Storage Media"; in IEEE Std. 1619.2-2021 (Revision of IEEE Std. 1619.2-2010), pp. 1-88; Jun. 16, 2021.

Luo, C. et al.; "Side-channel power analysis of XTS-AES"; Design, Automation & Test in Europe Conference & Exhibition 2017, Lausanne, Switzerland; 2017; pp. 1330-1335.

Final Office Action mailed Nov. 8, 2024 for U.S. Appl. No. 18/223,662; 10 pages.

Meijer, C. et al.; "Self-Encrypting Deception: Weaknesses in the Encryption of Solid State Drives"; 2019 IEEE Symposium on Security and Privacy (SP); San Francisco, CA, USA; 2019; pp. 72-87.

Wilke, L. et al.; "SEVurity: No Security Without Integrity: Breaking Integrity-Free Memory Encryption with Minimal Assumptions"; 2020 IEEE Symposium on Security and Privacy (SP); San Francisco, CA, USA; 2020; pp. 1483-1496.

\* cited by examiner

| Clock Freq | Clock Period | Total AES-XTS Decryption Cycles | | Total AES-XTS Decryption Latency | % of overall 25ns read latency budget of MRAM channel controller (MCC) |
| --- | --- | --- | --- | --- | --- |
| | | Tweak Generation Cycles | Data Decryption Cycles | | |
| 2Ghz | 0.5ns | 14-16 | 14-16 | 14ns -16ns | 56% - 64% |
| 1.6Ghz | 0.625ns | 14 | 14 | 17.5ns | 70% |
| 1Ghz | 1ns | 14 | 14 | 28ns | 112% |

FIG. 6

| Clock Freq | Clock Period | Total AES-XTS Decryption Cycles | | Total AES-XTS Decryption Latency | % of overall 25ns read latency budget of MRAM channel controller (MCC) |
|---|---|---|---|---|---|
| | | Tweak Generation Cycles (Hidden) | Data Decryption Cycles | | |
| 2Ghz | 0.5ns | 0 | 14-16 | 7ns -8ns | 28% - 32% |
| 1.6Ghz | 0.625ns | 0 | 14 | 8.75ns | 35% |
| 1Ghz | 1ns | 0 | 14 | 14ns | 56% |

FIG. 9

DATA STORAGE DEVICE AND METHOD FOR HIDING TWEAK GENERATION LATENCY

BACKGROUND

A data storage device can have a security engine to perform encryption and decryption of data. An example of a cryptographic algorithm that can be used by the security engine is AES-XTS, which refers to Advanced Encryption Standard (AES) cryptography that uses an XOR Encrypt XOR (XEX) Tweakable Block Cipher with Ciphertext Stealing (XTS). In AES-XTS, two keys are used-one to perform AES block encryption and the other to encrypt a "tweak value."

BRIEF DESCRIPTION OF THE DRAWINGS

FIG. 6 is a chart comparing decryption latency and a total read latency budget of an embodiment.

FIG. 9 is a chart comparing decryption latency and a total read latency budget of an embodiment.

DETAILED DESCRIPTION

The following embodiments generally relate to a data storage device and method for hiding tweak generation latency (e.g., in AES-XTS decryption). In one embodiment, a data storage device is provided comprising a memory, a memory controller, and a decryption engine. The memory controller comprises one or more processors, individually or in combination, configured to read encrypted data stored in a physical address in the memory. The decryption engine comprises a tweak buffer and one or more processors. The one or more processors in the decryption engine, individually or in combination, are configured to: receive a logical address and a request tag, wherein the physical address is translated from the logical address; calculate a tweak value from the logical address; store the tweak value and the request tag in the tweak buffer; receive the encrypted data and the request tag from the memory controller; and in response to receiving the encrypted data and the request tag from the memory controller: use the request tag to retrieve the tweak value from the tweak buffer; and use the tweak value to decrypt the encrypted data.

In another embodiment, a method is provided that is performed in a decryption engine in a data storage device. The method comprises: receiving a logical address; while the data storage device is translating the logical address to a physical address, using the logical address to generate a value needed to decrypt encrypted data stored at the physical address in the memory; storing the value in a buffer in the decryption engine; receiving the encrypted data from the memory; retrieving the value from the buffer; and using the value to decrypt the encrypted data.

In yet another embodiment, a data storage device is provided comprising: a memory; and means for reducing latency in decrypting encrypted data read from a physical address in memory by translating a logical address to the physical address in parallel with using the logical address to generate a value needed to decrypt the encrypted data.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
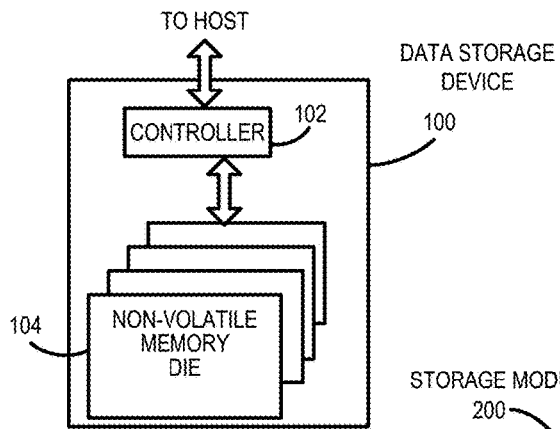
FIG. 1A is a block diagram of a data storage device of an embodiment.
Figure 1B:
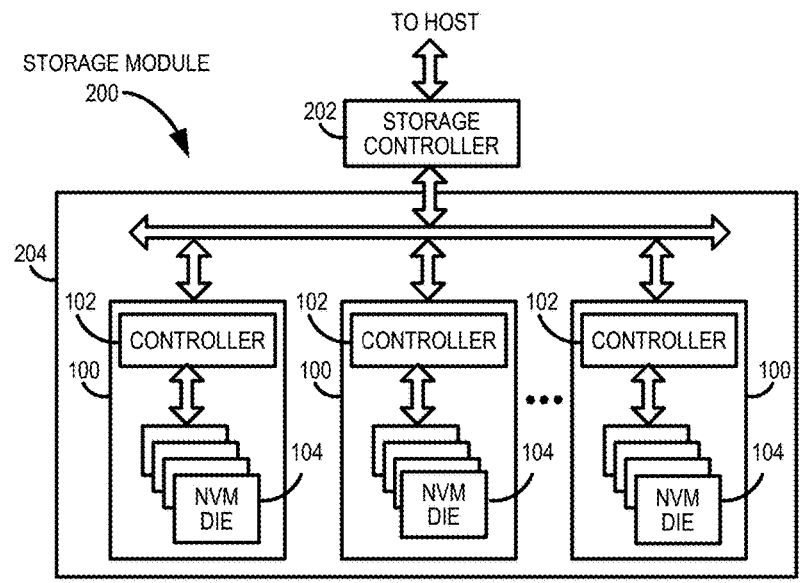
FIG. 1B is a block diagram illustrating a storage module of an embodiment.
Figure 1C:
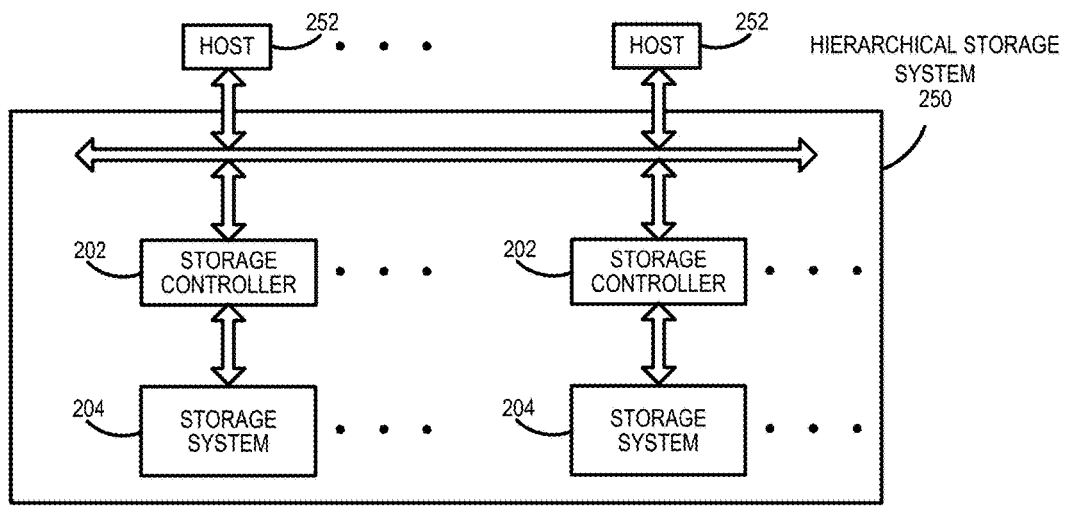
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
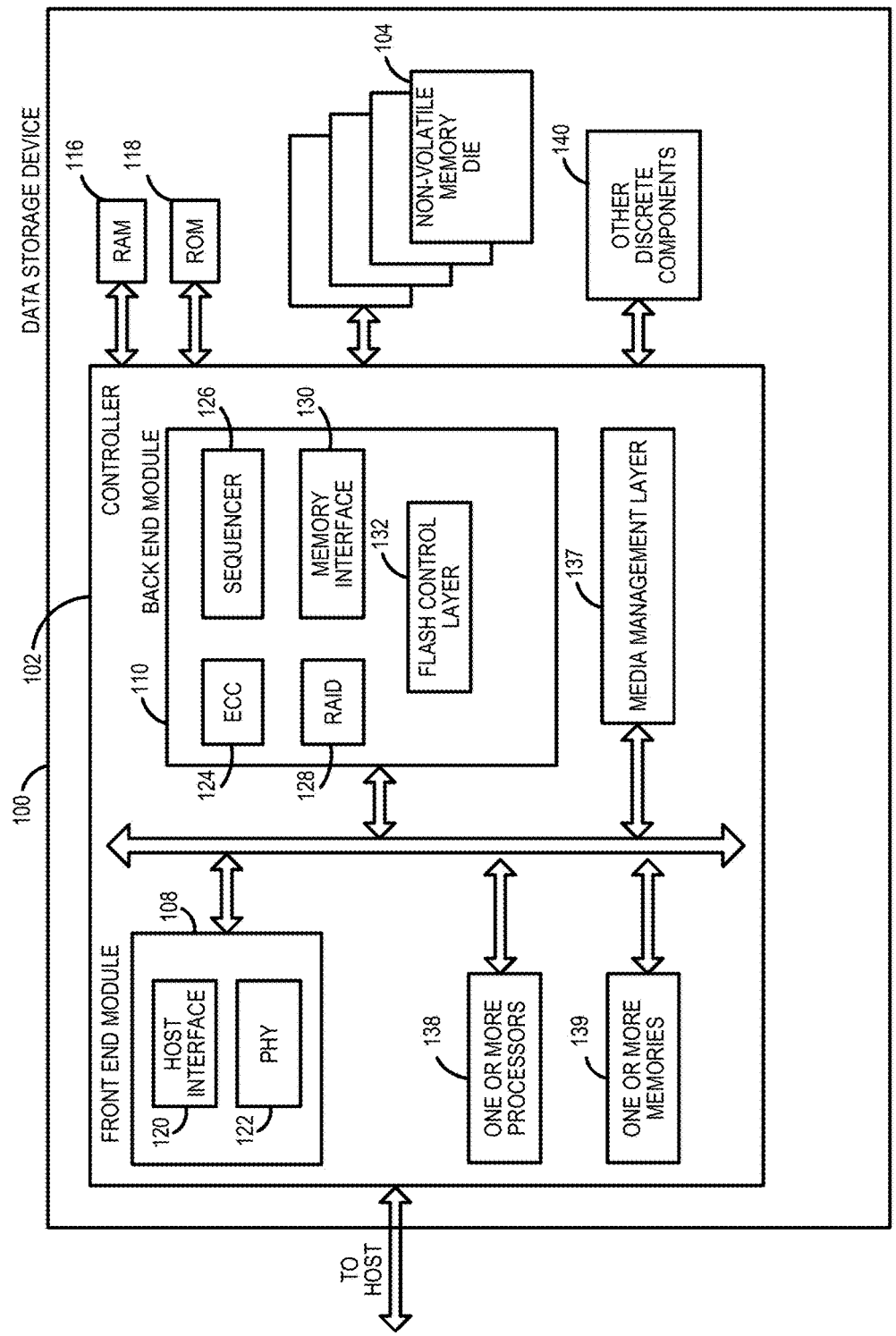
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with storage system 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory die 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
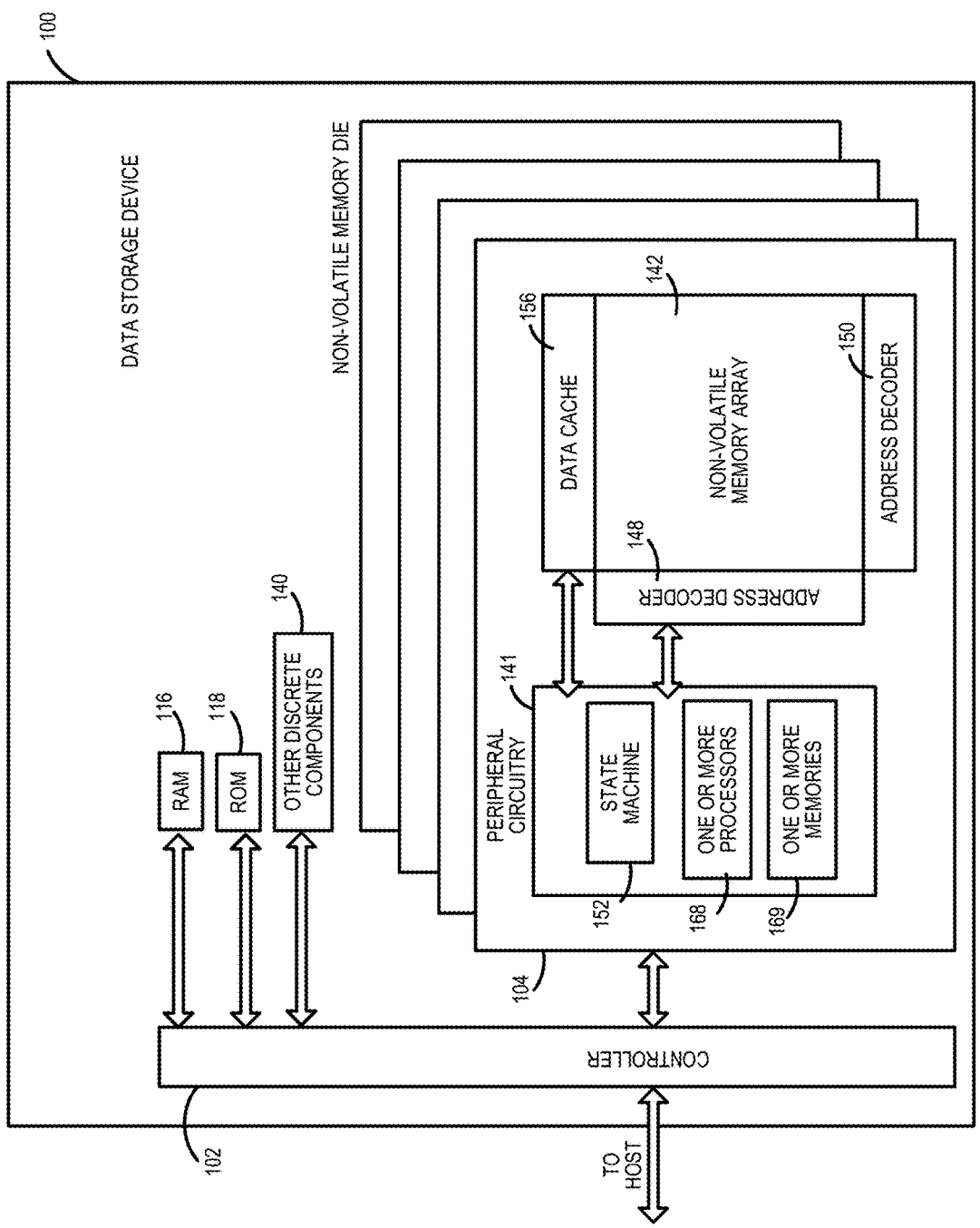
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the non-volatile memory die 104 can comprise one or more processors 168 that are, individually or in combination, configured to execute computer-readable program code stored in one or more non-transitory memories 169, stored in the memory array 142, or stored outside the non-volatile memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the non-volatile memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, non-volatile memory die 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the non-volatile memory die 104. The FTL may be needed because the non-volatile memory die 104 may have limited endurance, may be written in only multiples of pages, and/or may not be written unless it is erased as a block. The FTL understands these potential limitations of the non-volatile memory die 104, which may not be visible to the host. Accordingly, the FTL attempts to translate the writes from host into writes into the memory non-volatile memory die 104.

The FTL may include a logical-to-physical address (L2P) map (sometimes referred to herein as a table or data structure) and allotted cache memory. In this way, the FTL translates logical block addresses ("LBAs") from the host to physical addresses in the non-volatile memory die 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
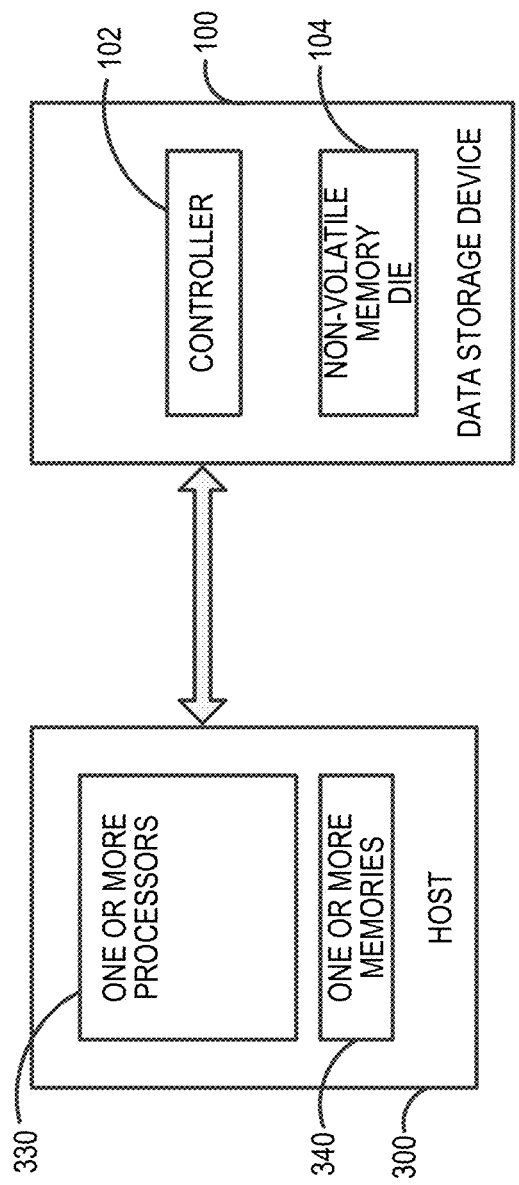
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's non-volatile memory die 104.

In one embodiment, the data storage device 100 comprise a security engine that is separate from (but can be controlled by) the controller 102 and is configured to perform encryption and/or decryption of data stored in the non-volatile memory die 104 of the data storage device 100. The security engine will sometimes be referred to herein as a decryption engine, but it should be understood that the security engine may also perform encryption (alternatively, a separate encryption engine can be used). The security engine can be implemented in any suitable way. In one embodiment, the security engine comprises arithmetic logic units (ALUs) configured to perform cryptographic processing in accordance with one or more cryptographic algorithms. Any suitable cryptographic algorithm can be used.

In one embodiment, the security engine includes an ALU configured to perform encryption and decryption in accordance with the Advanced Encryption Standard (AES) established by the United States National Institute of Standards and Technology (NIST). The AES ALU can comprise control circuitry as well as an AES cryptography core. The AES core can be configured to cryptographically process blocks of data that are a set block size, such as 128 bits. To encrypt data larger than the set block size, AES can use a block cipher mode, such as XTS. XTS stands for "XEX Tweakable Block Cipher with Ciphertext Stealing," where XEX stands for "XOR Encrypt XOR." In general, AES is a block cipher, and XTS is a block cipher mode that uses two AES keys-one to perform AES block encryption and the another to encrypt a "tweak value," which can be used to update the encryption mechanism for each block of data encrypted within a sequence of blocks. Within the AES-XTS standard, the tweak value is a 128-bit element in a Galois Field (GF).

Figure 4:
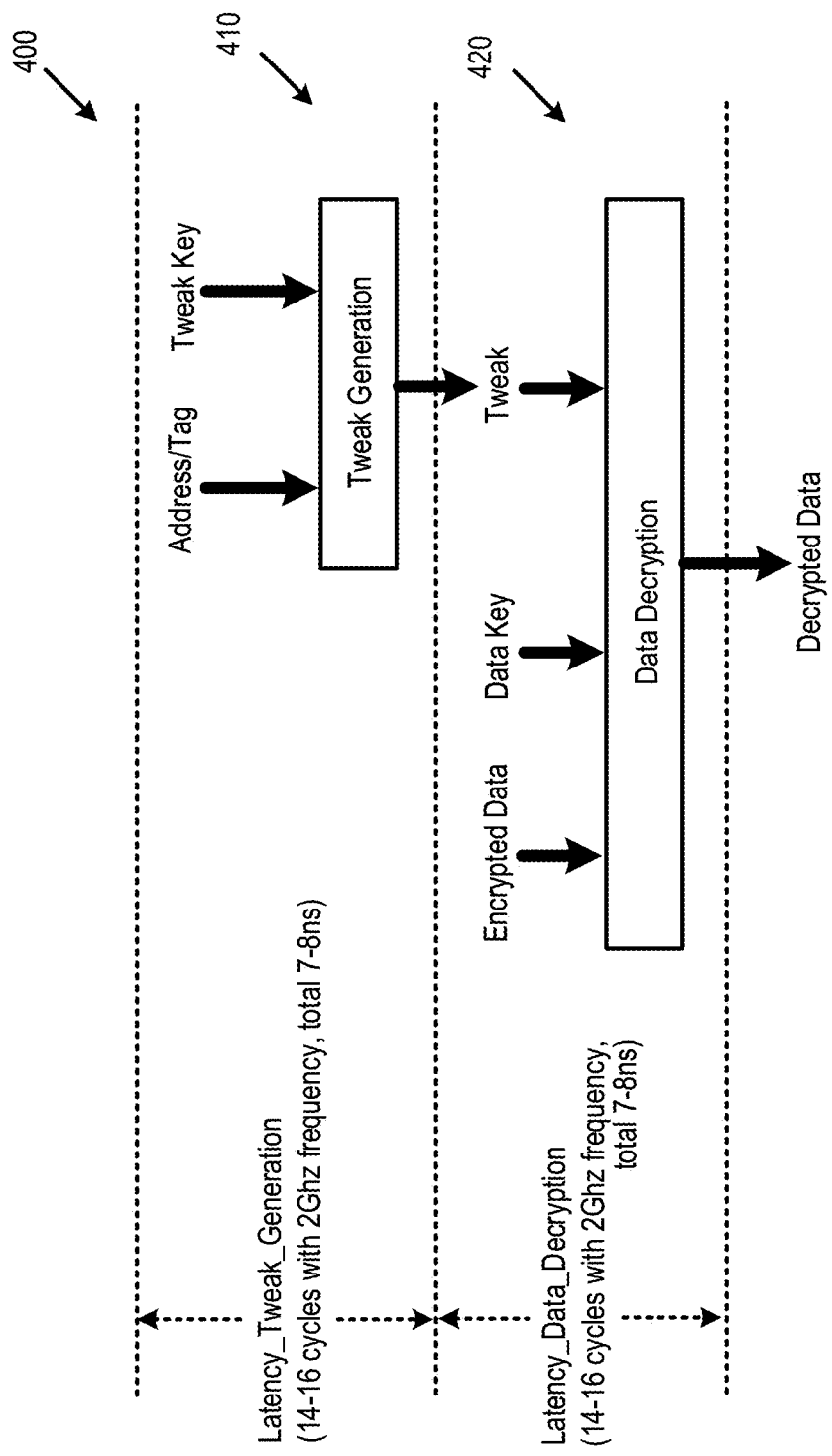
FIG. 4 is a flow chart of a method of an embodiment for decrypting data using an AES-XTS decryption algorithm.

Data encrypted using AES-XTS is effectively double-encrypted using two independent keys, and the security engine performs the reverse process to decrypt the data. For example, as shown in the flow diagram 400 in FIG. 4, the reverse process can comprise a two-step process: a tweak generation stage 410 and a data decryption stage 420. In the tweak generation stage 410, the tweak generator generates a tweak value from a tweak key and a logical address (and/or tag) of data retrieved from the non-volatile memory die 104. In the data decryption stage 420, the encrypted data, the data key for the data, and the tweak value are provided to a decryption engine, which outputs the decrypted data. These two stages need to be performed sequentially because the second stage need the tweak value, which is the outcome of the first stage. Also, as indicated in FIG. 4, each of these stages 410, 420 is associated with the same latency (e.g., 14-16 cycles with 2 GHz frequency, totaling 7-8 ns) in hardware implementation. In addition to these latencies, there is a latency in reading the encrypted data from the non-volatile memory die 104 ("memory" is sometime referred to below as "media").

Figure 5:
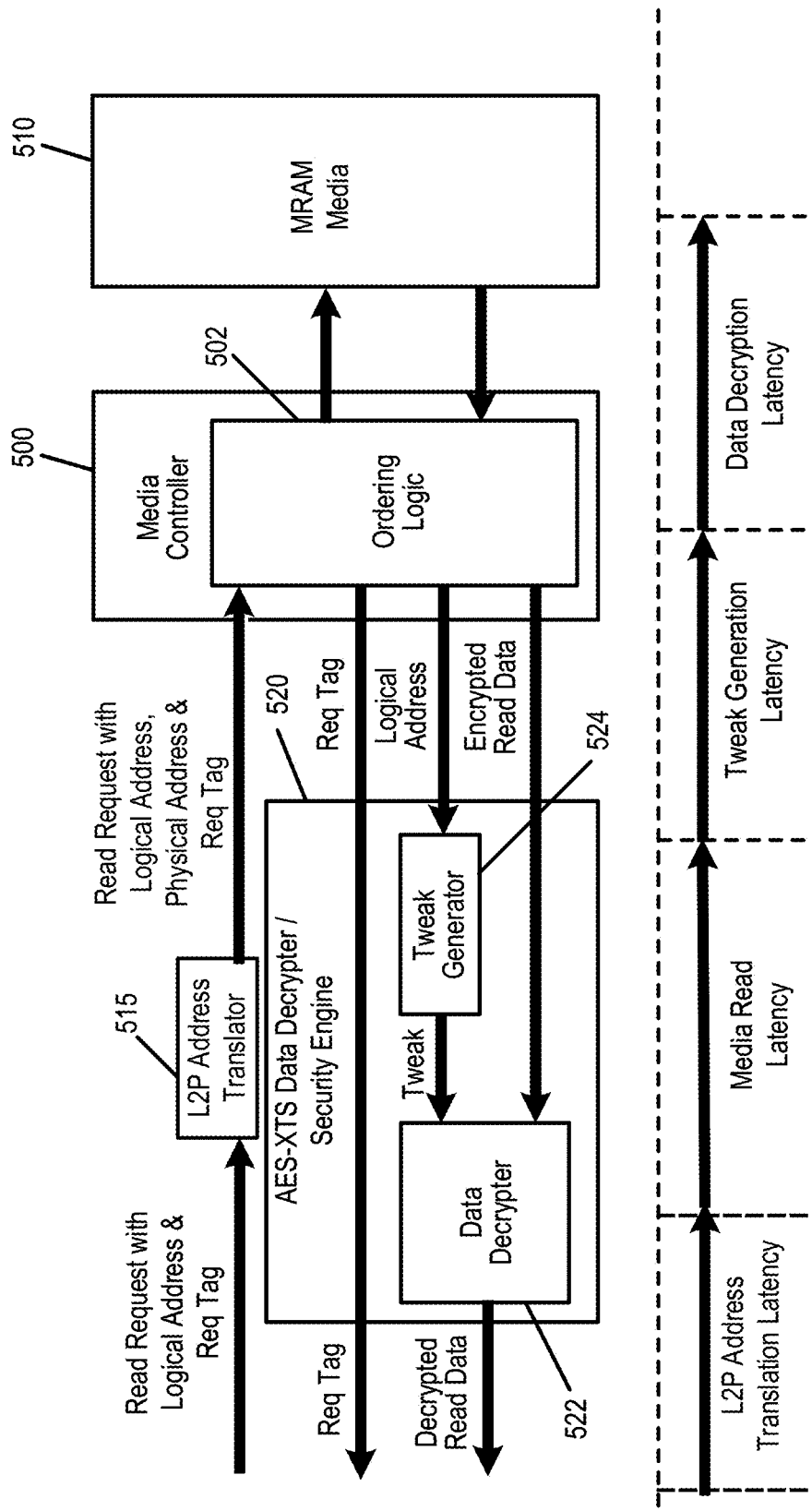
FIG. 5 is a block diagram of a data storage device of an embodiment.

FIG. 5 is a block diagram of some example components of a data storage device of an embodiment. As shown in FIG. 5, these components include a media controller 500 comprising ordering logic 502 and media/memory 510. In this example, the media controller 500 can comprise one or more processors that are, individually or in combination, configured to perform the functions described herein and, optionally, other functions. Also in this example, the media 510 comprises MRAM, although any suitable type of memory can be used. As MRAM may be a relatively-less reliable form of memory (e.g., compared to NAND), it can benefit from the robustness offered by AES-XTS. FIG. 5 also shows that the media controller 500 is in communication with an AES-XTS data decrypter/security engine 520, which comprises a data decrypter 522 and a tweak generator 524. Additional/different components can be used. For example, the security engine 520 can also have a data encrypter (or a separate encryption engine can be used), as well as flip-flop(s) in the request tag path. Also, while the security engine 520 is configured to use AES-XTS in this embodiment, a different algorithm is used in other embodiments.

As shown in FIG. 5, the data storage device receives, from a host, a logical address from a read command and a request tag that identifies the process in the host 300 that is requesting the data. A logical-to-physical ("L2P") address converter 515 (located in any suitable location in the data storage device) translates the received logical address into a corresponding physical address, which is provided, along with the request tag, to the medio controller 500. The ordering logic 502 in the media controller 500 determines the order of this request with respect to other received requests and, at the appropriate time, reads the encrypted data from the media 510. The media controller 500 then provides the tag, the encrypted data, and the logical address of the encrypted data to the security engine 520. The logical address is used by the tweak generator 524 to generate the tweak value, which is provided as an input, along with the encrypted data, to the data decrypter 522, which decrypts and outputs decrypted data. In this example, the tag is simply passed through the security engine 520 (e.g., using flip flops to sync its delivery to the host with the decrypted data). In other examples, the tag is provided as an input to the tweak generator 524 in addition to or instead of the logical address. As shown at the bottom of FIG. 5 and in the chart of FIG. 6, tweak computation and data decryption take same amount of time (in this example, 14-16 cycles with 2 Ghz frequency, totaling 7-8 ns) in hardware implementation and results in a relatively-high latency overhead. As also shown in this data, this implementation has substantial latency overhead, as the latencies for different clock speeds range from 14 ns to 28 ns, taking 56%-112% overall latency budget for the whole MRAM channel controller (MCC).

U.S. patent application Ser. No. 18/223,662, filed Jul. 19, 2023, which is hereby incorporated by reference, describes a solution for hiding tweak generation latency by effectively hiding the latency to compute the tweak value in the latency to read the encrypted data from the media. Given that AES-XTS decryption latency represents a large part of read round-trip latency within an MRAM Channel Controller (MCC), these embodiments can substantially reduce the read round-trip latency of an MCC.

Figure 7:
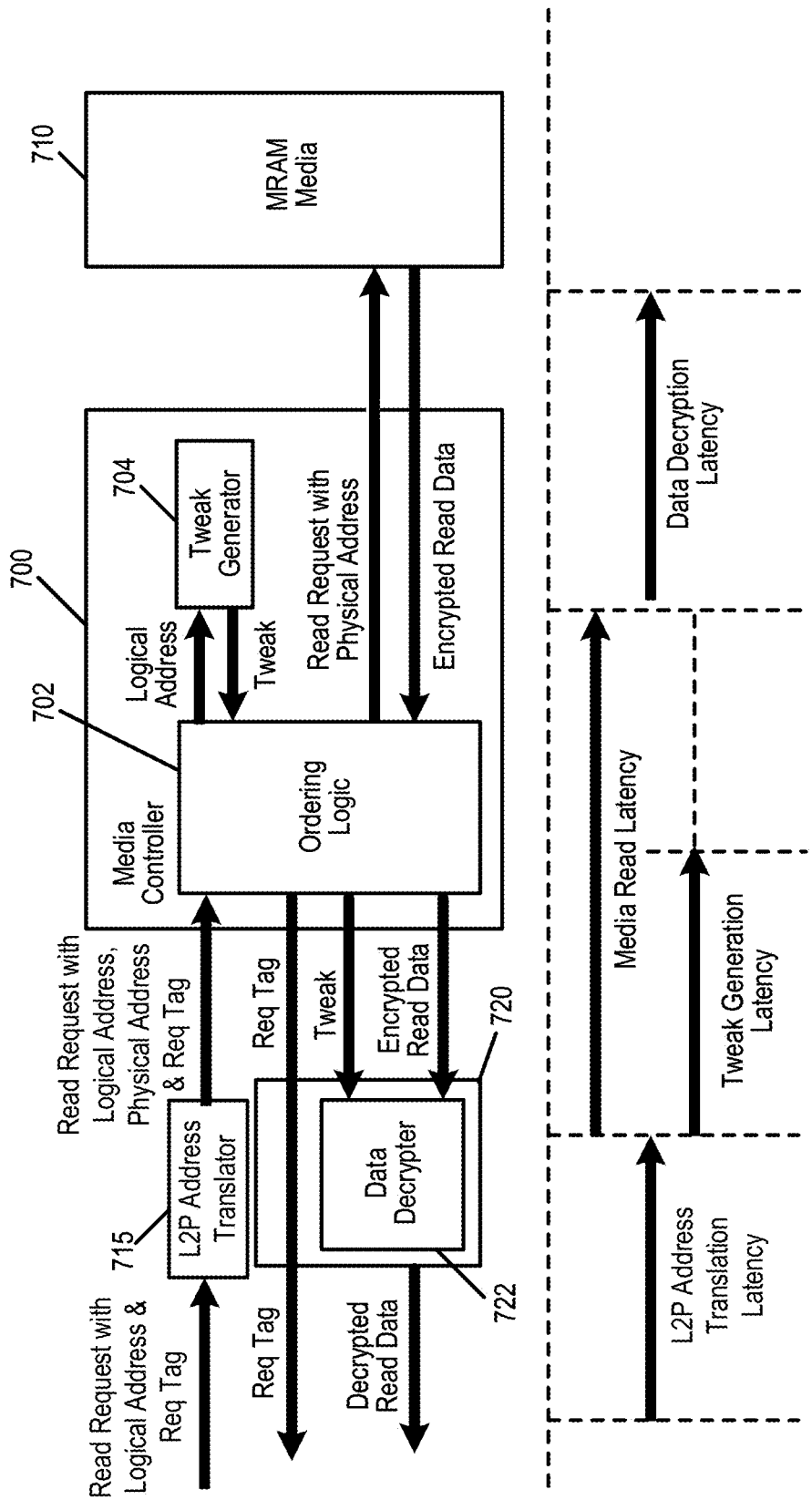
FIG. 7 is a block diagram of a data storage device of an embodiment.

FIG. 7 is an illustration of a variation of one of the embodiments described in the '662 application. As shown in FIG. 7 and as compared to the embodiment shown in FIG. 5, the tweak generator 704 is moved from the data decrypter/security engine 720 to the media controller 700. In operation, the data storage device receives, from the host, a logical address associated with a read command and a request tag that identifies the process in the host that is requesting the data. A logical-to-physical ("L2P") address converter 715 (located in any suitable location in the data storage device) translates the received logical address into a corresponding physical address, which is provided, along with the request tag, to the medio controller 700. The ordering logic 702 in the media controller 700 determines the order of this request with respect to other received requests and, at the appropriate time, reads the encrypted data from the media 710. In this embodiment, the tweak generator 704 generates the tweak value during the latency associated with reading the encrypted data from the media 710. That way, the tweak value is already generated by the time the media controller 700 is ready to send the encrypted data to the security engine 720. This allows both the encrypted data and the tweak value to be sent to the security engine 720 at the same time, so the data decrypter 722 can begin decrypting the encrypted data upon receipt rather than having to wait for the tweak value to be generated. That is, preparing the tweak value during the sensing time from the media 510 hides the tweak generation in the read pipe. Hence, when the data is received from the media 510, the AES decryption process can start immediately without further delay.

As shown at the bottom of FIG. 7 the media read latency, tweak generation latency, and data decryption latency are reduced as compared to the embodiment described above. More specifically, moving the tweak generator to the media controller so tweak value generation can be done in parallel with the media read allows the tweak generation latency to be hidden within the media read latency. By doing so, the total AES-XTS decryption latency can be halved, resulting in an AES-XTS decryption latency taking 28-56% of the overall MCC budget, in one example.

One potential issue with this solution is that it may be tightly coupled with the media read operation in the media controller 700, as discussed in detail in the '662 application. As such, this solution may need additional support to handle the case in which media reads are not needed (e.g., a read buffer hit), which can have extra complexity and/or performance overhead. Also, the tweak is computed with a logical address, but the media controller 700 operates with a physical address. As a result, the logical address has to be passed to media controller 700 only for the tweak computation, which can add complexity to the media controller 700 and cross-module interfaces.

The following embodiments can be used to address these issues. In general, these embodiments can be used to hide the latency to compute the tweak of AES-XTS decryption and, thus, substantially reduce the latency of the total AES-XTS decryption latency. More specifically, these embodiments can effectively hide the latency to compute the tweak value in the latency of the logical-to-physical address translation process. Given that AES-XTS decryption latency represents a large part of read round-trip latency within the MRAM Channel Controller (MCC), these embodiments can, thus substantially, reduce the read round-trip latency of the MCC.

Figure 8:
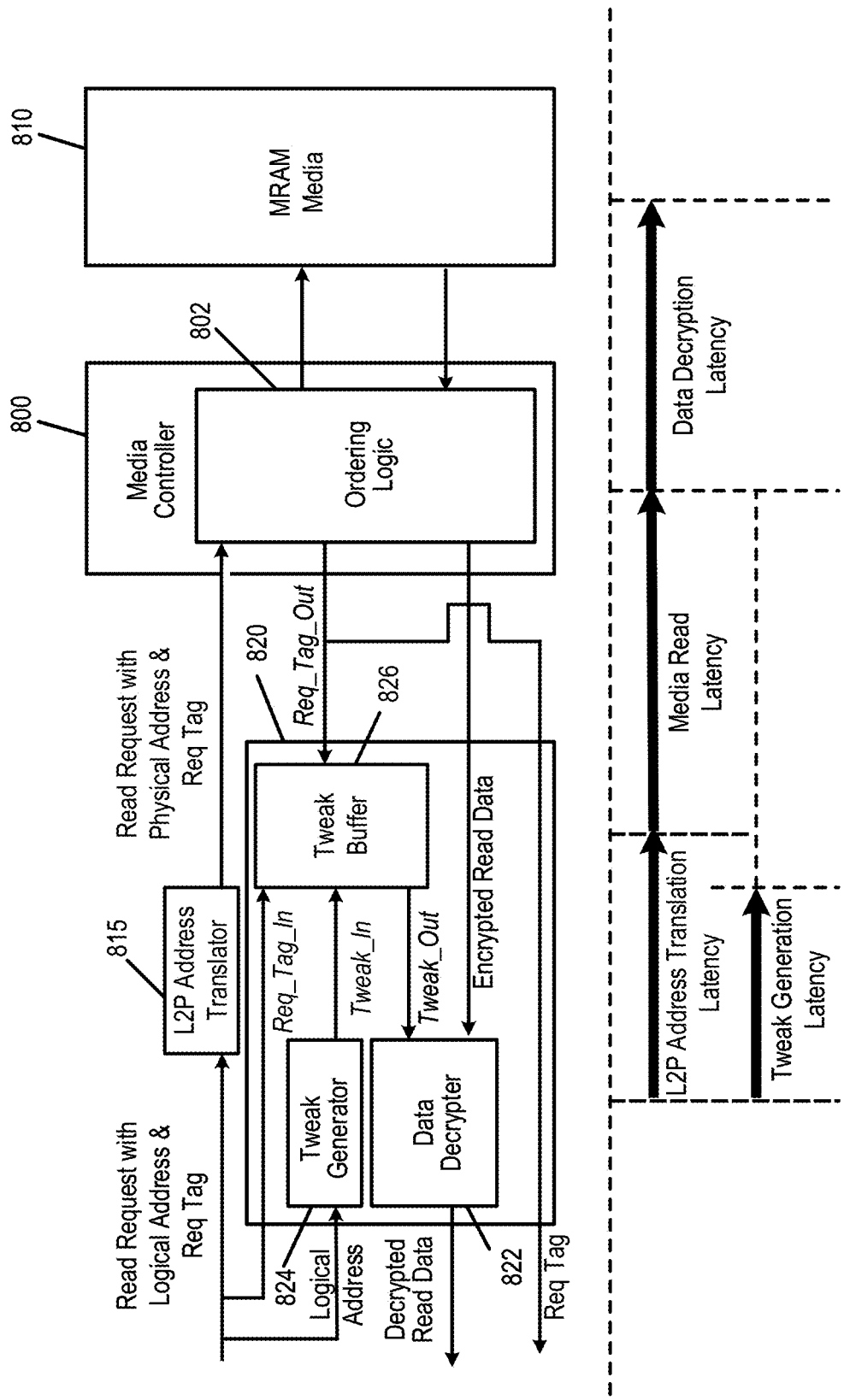
FIG. 8 is a block diagram of a data storage device of an embodiment.

Turning again to the drawings, FIG. 8 is a block diagram of a data storage device of an embodiment. As shown in FIG. 8, in this embodiment, the data storage device comprises a media controller 800 comprising ordering logic 802 and media/memory 810. In this example, the media controller 800 can comprise one or more processors that are, individually or in combination, configured to perform the functions described herein and, optionally, other functions. Also in this example, the media 810 comprises MRAM, although any suitable type of memory can be used. FIG. 8 also shows that the media controller 800 is in communication with an AES-XTS data decrypter/security engine 820, which comprises a data decrypter 822, a tweak generator 824, and a tweak buffer 826.

As shown in FIG. 8, the data storage device receives, from a host, a logical address associated with a read command and a request tag that identifies the process in the host that is requesting the data. A logical-to-physical ("L2P") address converter 815 (located in any suitable location in the data storage device) translates the received logical address into a corresponding physical address, which is provided, along with the request tag, to the medio controller 800. The ordering logic 802 in the media controller 800 determines the order of this request with respect to other received requests and, at the appropriate time, reads the encrypted data from the physical address in the media 810. The media controller 800 then provides the tag and the encrypted data to the security engine 820.

As also shown in FIG. 8, in this embodiment, as soon as a read request has been issued, its request tag and logical address are sent to decrypter engine 820. The decrypter engine 820 first calculates the tweak value from the logical address, and then the tweak value and its associated request tag are sent to the tweak buffer 826 for storage. When the encrypted read data comes back from media controller 800, the data decrypter 820 looks up the tweak associated with the exact request tag in the tweak buffer 826. It then uses that tweak for data decryption.

There are several advantages associated with this embodiment. For example, this embodiment begins tweak generation as the earliest possible time and, thus, is the most capable of tweak generation latency hiding. This is illustrated at the bottom of FIG. 8 and in the chart of FIG. 9. Also, this solution has no complex corner cases, and the interfaces among modules are simplified. Further, the media controller 820 does not to interact with the logical address. Additionally, because of the clear functionality division in this solution, it is also easier to debug and verify.

Figure 10:
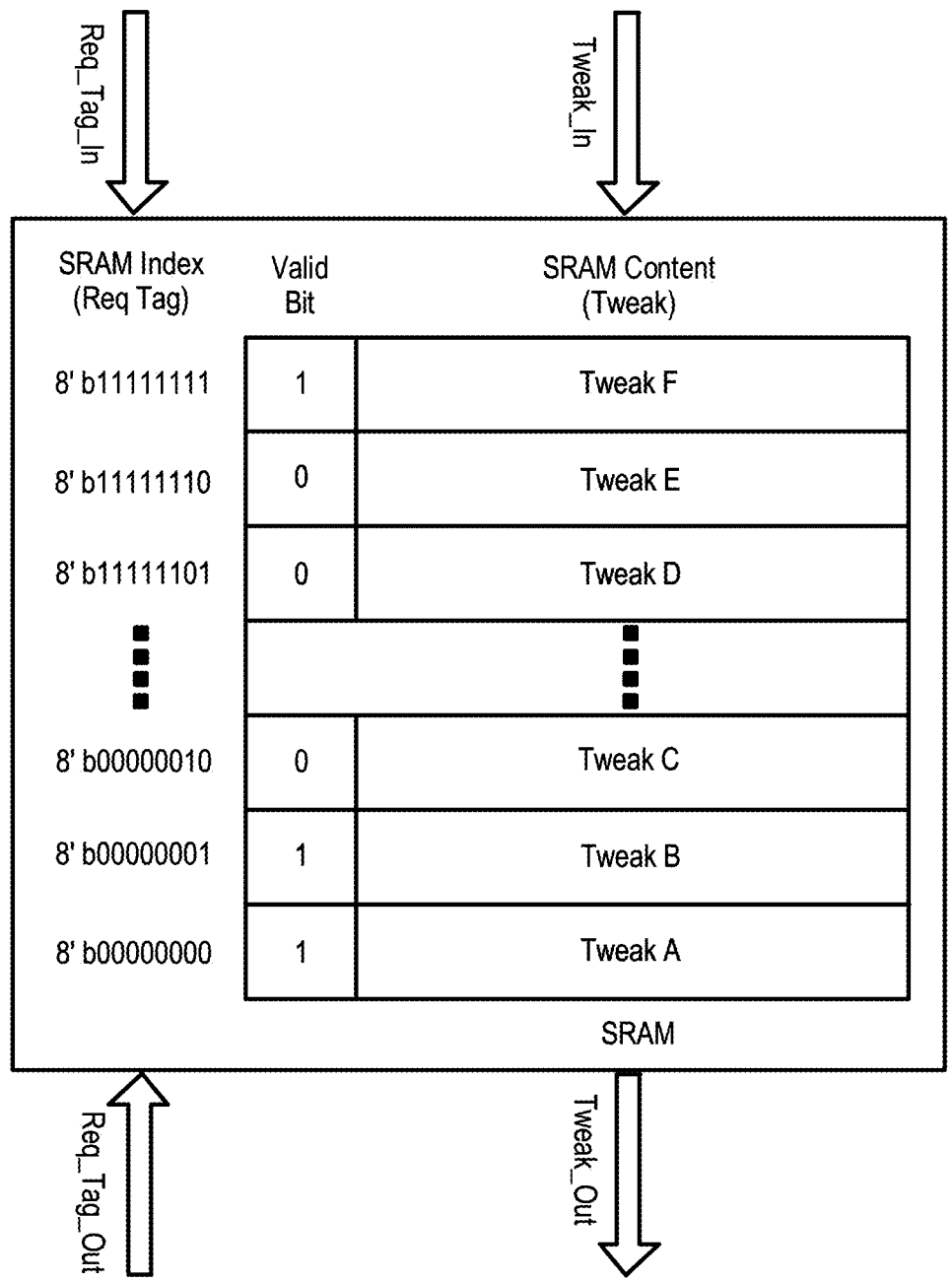
FIG. 10 is an illustration of a tweak buffer of an embodiment that is implemented using static random-access memory (SRAM).
Figure 11:
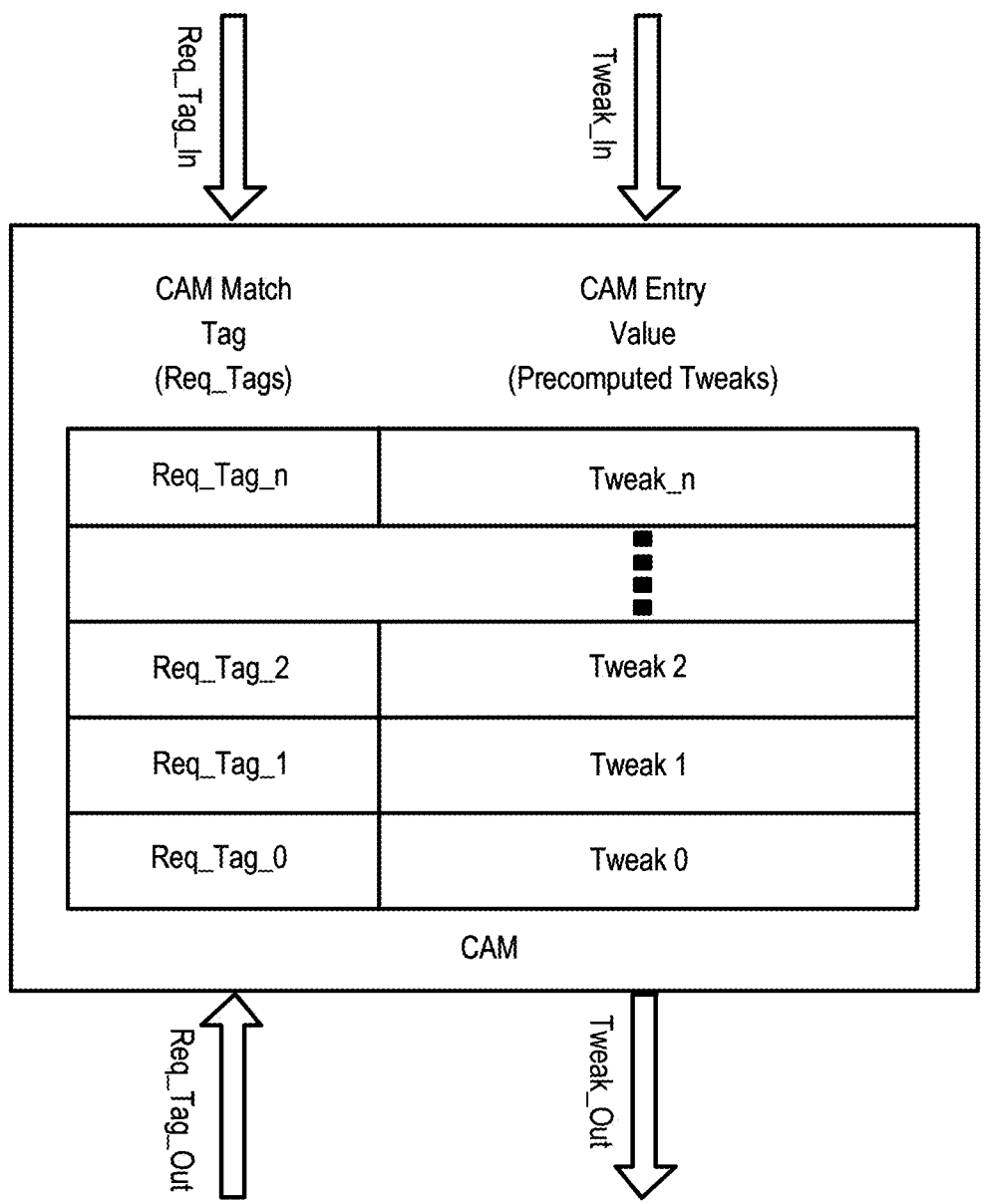
FIG. 11 is an illustration of a tweak buffer of an embodiment that is implemented using a content-addressable memory (CAM).

The tweak buffer can be implemented in any suitable way. The following paragraphs and FIGS. 10 and 11 provide two example implementations. It should be understood that these are merely example and that other implementations can be used. Turning first to FIG. 10, FIG. 10 shows an example embodiment in which the tweak buffer is implemented using static random-access memory (SRAM). If the Req_Tag (Request Tag) field has a limited number of bits (e.g., 10 bits), a SRAM structure can be used to store the precomputed tweaks in the tweak buffer. The tweak buffer can have a SRAM that is indexed by Req_Tag, and each entry can store a tweak and a valid bit. For example, if Req_Tag has 10 bits, the SRAM module has 2^10=1024 tweak entries. All valid bits can be initialized as 1'b0. When a precomputed read tweak and its associated request tag are ready, they can be issued to the tweak buffer through Tweak_In and Req_Tag_In buses. The tweak buffer can then store the Tweak_In value in the entry at index Req_Tag_In and set the entry valid bit to 1. Optionally, the entry to be written can always be invalid (valid bit 1'b0). When the read data comes back with its request tag (Req_Tag_Out), the decrypter can look-up the precomputed tweak in the tweak buffer at index Req_Tag_Out. If the entry is valid, its tweak value can be passed to the data decrypter through the Tweak_Out bus. The valid bit can then be reset to 1'b0. If the entry is invalid (meaning the tweak computation is not finished), the data decryption can be blocked until the entry becomes valid.

Turning now to FIG. 11, FIG. 11 shows an example embodiment in which the tweak buffer is implemented using a content-addressable memory (CAM). In this embodiment, if the Req_Tag (request tag) field has a large number of bits (e.g., >16 bits), it may be inefficient to use the SRAM solution because of the large number of entries needed. Instead, a CAM structure can be used to store the precomputed tweaks in the tweak buffer. The CAM version can use a CAM to associate the Req_Tag to the precomputed tweak value. All entries of the CAM can be initialized with an invalid Req_Tag value (i.e., a tag value that is not used by any request). When a precomputed read tweak and its associated request tag are ready, they can be issued to the tweak buffer through the Tweak_In and Req_Tag_In buses. The tweak buffer then initializes a CAM entry with its CAM Match Tag as Req_Tag_In and its entry value as Tweak_In. Optionally, the tweak buffer can verify that there is no match of Req_Tag_In before it initializes a new entry. When the read data comes back with its request tag (Req_Tag_Out), the tweak buffer can look-up the Req_Tag_Out in the CAM: If there is a match CAM entry, its value can be passed to the data decrypter through the Tweak_Out bus. The tag of the matched CAM entry can then be reset to an invalid Req_Tag value. If there is no match CAM entry (meaning the tweak computation is not finished), the data decryption can be blocked until the entry becomes valid.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory;
   a memory controller comprising one or more processors, individually or in combination, configured to read encrypted data stored in a physical address in the memory;
   a logical-address-to-physical-address translator configured to:
      receive a read request from a host, wherein the read request comprises a logical address and a request tag, wherein the logical address is in an unencoded format;
      translate the logical address to the physical address in the memory; and
      provide, to the memory controller, the read request with the physical address and the request tag; and
   a decryption engine comprising:
      a tweak buffer comprising a content-addressable memory (CAM);
      a tweak generator configured to:
         receive the logical address that is in the read request from the host;
         calculate a tweak value from the logical address that is in the read request from the host, wherein the tweak value is calculated in parallel to the logical address being translated to the physical address, and wherein a latency to calculate the tweak value is less than a latency to translate the physical address from the logical address; and
         store the tweak value and the request tag in the tweak buffer by:
            verifying that there is no match for the request tag in the tweak buffer; and
            in response to verifying that there is no match for the request tag in the tweak buffer, initializing a CAM entry in the tweak buffer that associates the tweak value with the request tag; and
      a decrypter configured to:
         receive the encrypted data and the request tag from the memory controller; and
         in response to receiving the encrypted data and the request tag from the memory controller:
            use the request tag to attempt to retrieve the tweak value from the tweak buffer;
            in response to the attempt to retrieve the tweak value from the tweak buffer being successful:
               use the tweak value to decrypt the encrypted data; and
               reset the request tag of the CAM entry to an invalid value; and
            in response to the attempt to retrieve the tweak value from the tweak buffer being unsuccessful, which indicates that the tweak calculation is not finished:
               re-attempt to retrieve the tweak value from the tweak buffer; and
               block decryption of the encrypted data until the re-attempt to retrieve the tweak value from the tweak buffer is successful.

2. The data storage device of claim 1, wherein the decrypter comprises an AES-XTS decryption engine, wherein AES-XTS refers to Advanced Encryption Standard (AES) cryptography that uses an exclusive-or (XOR) Encrypt XOR (XEX) Tweakable Block Cipher with Ciphertext Stealing (XTS).

3. The data storage device of claim 1, wherein the memory controller comprises ordering logic.

4. The data storage device of claim 1, wherein the memory comprises magnetoresistive random-access memory (MRAM).

5. The data storage device of claim 1, wherein the memory comprises a three-dimensional memory.

6. In a decryption engine in a data storage device, a method comprising:
   receiving a read request from a host, wherein the read request comprises a logical address and a request tag, wherein the logical address is in an unencoded format;
   translating the logical address to a physical address of a memory of the data storage device;
   while the data storage device is translating the logical address to the physical address, using the logical address that is in the read request from the host to generate a value needed to decrypt encrypted data stored at the physical address in the memory, wherein a latency to calculate the value is less than a latency to translate the logical address to the physical address;
   storing the value in a buffer in the decryption engine, wherein the buffer comprises a content-addressable memory (CAM), and wherein storing the value in the buffer comprises:
      verifying that there is no match for the request tag in the buffer; and
      in response to verifying that there is no match for the request tag in the buffer, initializing a CAM entry in the buffer that associates the value with the request tag;
   receiving the encrypted data from the memory;
   attempting to retrieve the value from the buffer;
   in response to the attempt to retrieve the value from the buffer being successful:
      using the value to decrypt the encrypted data; and
      resetting the request tag of the CAM entry to an invalid value; and
   in response to the attempt to retrieve the value from the buffer being unsuccessful, which indicates that generation of the value is not finished:
      re-attempting to retrieve the value from the buffer; and
      blocking decryption of the encrypted data until the re-attempt to retrieve the value from the tweak is successful.

7. The method of claim 6, wherein the value comprises a tweak value.

8. The method of claim 6, wherein the decryption engine is configured to decrypt the encrypted data using an AES-XTS algorithm, wherein AES-XTS refers to Advanced Encryption Standard (AES) cryptography that uses an exclusive-or (XOR) Encrypt XOR (XEX) Tweakable Block Cipher with Ciphertext Stealing (XTS).

9. The method of claim 6, wherein the decryption engine comprises a tweak generator and a data decryptor.

10. The method of claim 6, wherein the memory comprises magnetoresistive random-access memory (MRAM).

11. The method of claim 6, wherein the memory comprises a three-dimensional memory.

12. A data storage device comprising:
    a memory; and
    means for:
       receiving a read request from a host, wherein the read request comprises a logical address and a request tag, wherein the logical address is in an unencoded format;

translating the logical address to a physical address of a memory of the data storage device;

while the data storage device is translating the logical address to the physical address, using the logical address that is in the read request from the host to generate a value needed to decrypt encrypted data stored at the physical address in the memory, wherein a latency to calculate the value is less than a latency to translate the logical address to the physical address;

storing the value in a buffer in the decryption engine, wherein the buffer comprises a content-addressable memory (CAM), and wherein storing the value in the buffer comprises:

verifying that there is no match for the request tag in the buffer; and in response to verifying that there is no match for the request tag in the buffer, initializing a CAM entry in the buffer that associates the value with the request tag;

receiving the encrypted data from the memory;

attempting to retrieve the value from the buffer;

in response to the attempt to retrieve the value from the buffer being successful:

using the value to decrypt the encrypted data; and resetting the request tag of the CAM entry to an invalid value; and in response to the attempt to retrieve the value from the buffer being unsuccessful. which indicates that generation of the value is not finished:

re-attempting to retrieve the value from the buffer; and blocking decryption of the encrypted data until the re-attempt to retrieve the value from the tweak is successful.

* * * * *